United States Patent
Altmikus

(10) Patent No.: US 10,961,980 B2
(45) Date of Patent: Mar. 30, 2021

(54) ACTUATOR DEVICE FOR A WIND TURBINE, WIND TURBINE AND METHOD OF ASSEMBLY

(71) Applicant: Wobben Properties GmbH, Aurich (DE)

(72) Inventor: Andree Altmikus, Aurich (DE)

(73) Assignee: Wobben Properties GmbH, Aurich (DE)

( * ) Notice: Subject to any disclaimer, the term of this patent is extended or adjusted under 35 U.S.C. 154(b) by 39 days.

(21) Appl. No.: 16/325,148

(22) PCT Filed: Jun. 19, 2017

(86) PCT No.: PCT/EP2017/064933
§ 371 (c)(1),
(2) Date: Feb. 12, 2019

(87) PCT Pub. No.: WO2018/041433
PCT Pub. Date: Mar. 8, 2018

(65) Prior Publication Data
US 2019/0226449 A1    Jul. 25, 2019

(30) Foreign Application Priority Data
Aug. 30, 2016    (DE) .................. 10 2016 116 138.1

(51) Int. Cl.
*F03D 1/00* (2006.01)
*F03D 7/02* (2006.01)
(Continued)

(52) U.S. Cl.
CPC .......... *F03D 7/022* (2013.01); *F03D 1/0675* (2013.01); *F03D 7/024* (2013.01); *F03D 7/0224* (2013.01);
(Continued)

(58) Field of Classification Search
CPC ........ F03D 7/022; F03D 7/0224; F03D 7/024; F05B 2240/30
See application file for complete search history.

(56) References Cited

U.S. PATENT DOCUMENTS 4,524,294 A * 6/1985 Brody ..................... H01L 41/08
                                                310/311
5,774,259 A * 6/1998 Saitoh .................. G10K 15/046
                                                359/246

(Continued)

FOREIGN PATENT DOCUMENTS

CN    101925795 A    12/2010
CN    201757024 U    3/2011
(Continued)

OTHER PUBLICATIONS

Iwaso et al., "Fast response dry-type artificial molecular muscles with [c2]daisy chains", *Nature Chemistry*, vol. 8, May 9, 2016, pp. 625-632.

(Continued)

*Primary Examiner* — Ninh H. Nguyen
(74) *Attorney, Agent, or Firm* — Seed Intellectual Property Law Group LLP

(57) ABSTRACT

An actuator device for a wind power installation, in particular for a rotor blade of a wind power installation, and also to an associated wind power installation and a method of assembly, with an actuator component and a control component, wherein the actuator component has at least one actuator layer with a preferential direction and, substantially parallel to the actuator layer, at least one exciting layer, wherein the actuator layer comprises a photoactuator, wherein the photoactuator is designed to change a strain and/or stress of the actuator layer in the preferential direction on the basis of excitation light, wherein the exciting layer is designed to guide excitation light into the actuator (Continued)

layer, wherein the control component comprises a light source and a light guide, wherein the light source is arranged away from the exciting layer and is connected to the exciting layer by means of the light guide. The actuator device makes it possible to ensure greater operational reliability.

28 Claims, 11 Drawing Sheets

(51) Int. Cl.
    *F03D 1/06*           (2006.01)
    *F03D 80/30*         (2016.01)

(52) U.S. Cl.
    CPC .......... *F03D 80/30* (2016.05); *F05B 2240/30* (2013.01); *F05B 2270/804* (2013.01); *Y02E 10/72* (2013.01)

(56) References Cited

U.S. PATENT DOCUMENTS

| | | | |
|---|---|---|---|
| 5,910,837 A * | 6/1999 | Gimzewski | G01Q 20/02 356/213 |
| 6,076,776 A | 6/2000 | Breitbach et al. | |
| 6,999,221 B1 * | 2/2006 | Sarkisov | H01L 41/08 359/244 |
| 7,293,959 B2 * | 11/2007 | Pedersen | F03D 7/024 416/23 |
| 7,922,450 B2 | 4/2011 | Narasimalu | |
| 8,917,383 B2 | 12/2014 | Fuglsang et al. | |
| 9,014,863 B2 | 4/2015 | Olesen | |
| 9,239,042 B2 | 1/2016 | Frankenstein et al. | |
| 9,441,614 B2 | 9/2016 | Olesen | |
| 2003/0156991 A1 * | 8/2003 | Halas | F16K 99/004 422/400 |
| 2009/0097976 A1 | 4/2009 | Driver et al. | |
| 2010/0181415 A1 | 7/2010 | Altmikus et al. | |
| 2011/0040497 A1 | 2/2011 | Olesen | |
| 2015/0204307 A1 | 7/2015 | Betran Palomas | |

FOREIGN PATENT DOCUMENTS

| | | | |
|---|---|---|---|
| CN | 102483038 A | 5/2012 | |
| DE | 19712034 A1 | 9/1998 | |
| DE | 102008037447 A1 | 4/2009 | |
| DE | 102010006544 B4 | 9/2011 | |
| DE | 102010047918 A1 | 4/2014 | |
| DE | 102013006166 A1 | 10/2014 | |
| EP | 2327876 A1 | 6/2011 | |
| EP | 2495434 B1 | 5/2014 | |
| EP | 3128169 A1 | 2/2017 | |
| EP | 2899395 B1 | 4/2017 | |
| GB | 2478600 A | 9/2011 | |
| JP | 2010285941 A | 12/2010 | |
| WO | WO-2006016907 A2 * | 2/2006 | ........... B81B 3/0018 |

OTHER PUBLICATIONS

Morimoto et al., "A Diarylethene Cocrystal that Converts Light into Mechanical Work", *Journal of American Chemical Society*, vol. 132, No. 40, Sep. 21, 2010, pp. 14172-14178.

Shepherd et al., "Molecular actuators driven by cooperative spin-state switching", *Nature Communications* 4:2607, Oct. 24, 2013, pp. 1-9.

* cited by examiner

ACTUATOR DEVICE FOR A WIND TURBINE, WIND TURBINE AND METHOD OF ASSEMBLY

BACKGROUND

Technical Field

The following invention relates to an actuator device for a wind power installation, in particular for a rotor blade of a wind power installation, to a wind power installation with this actuator device and also to a method of assembly for assembling an actuator device.

Description of the Related Art

Actuators convert signals into mechanical motion or other physical variables, such as for example pressure, temperature, et cetera. The signals are often transmitted by way of electrical lines. Known actuators are, for example, bimetallic actuators, hydraulic or pneumatic actuators and piezo actuators, to name just a few.

When they are used in wind power installations, in particular in rotor blades of wind power installations, actuators control, for example, the lift, in that they control rotor blade flaps and/or cause a twisting of the rotor blade itself. One disadvantage of the known actuator devices for wind power installations is the susceptibility to lightning strikes that the electrical lines entail. It would therefore be desirable to provide an actuation mechanism for rotor blades of wind power installations that has a lower accompanying risk of lightning strikes.

BRIEF SUMMARY

Provided is an actuator device for a wind power installation, a wind power installation with this actuator device and a method of assembly for assembling an actuator device that ensure greater operational reliability.

In one aspect, an actuator device for a wind power installation, in particular for a rotor blade of a wind power installation, with an actuator component and a control component is provided. The actuator component has at least one actuator layer with a preferential direction and, substantially parallel to the actuator layer, at least one exciting layer. The actuator layer comprises a photoactuator, wherein the photoactuator is designed to change a strain and/or stress of the actuator layer in the preferential direction on the basis of excitation light. The exciting layer is designed to guide excitation light into the actuator layer. The control component comprises a light source and a light guide, wherein the light source is arranged away from the exciting layer and is connected to the exciting layer by means of the light guide.

A photoactuator has the property of converting incident light directly into mechanical motion, without, for example, first converting it into electrical energy. The use of a photoactuator consequently makes it possible to simplify the two conversion processes that are usually required in the case of light-controlled actuators, to be specific first the conversion of the light energy into electrical energy and subsequently the conversion of the electrical energy into mechanical energy.

The fact that the control component has a light guide which connects the light source to the exciting layer makes it possible to provide the actuator component without electrical connecting lines, or electrically conducting components. The light of the light source guided through the light guide influences the photoactuator, which converts the incident excitation light directly into strain and/or stress of the actuator layer.

In one embodiment, the photoactuator comprises at least one photostrictive actuator and/or photomechanical actuator.

Photostriction is the direct conversion of irradiated light into strain. Photomechanical actuators quite generally produce mechanical motion as a reaction to irradiation of light, irrespective of strain. At the same time, photomechanical actuators also comprise those that are based on secondary effects of light irradiation, such as for example heating.

The photoactuator is preferably made in such a way that the excitation of the photoactuator is initiated directly as a primary effect by the exciting light. In addition or as an alternative, it may be that secondary effects, for example due to thermal heating as a result of the incident light, as excitation of the photoactuator can be used for doing mechanical work, for example for changing a strain and/or stress in the preferential direction.

In one embodiment, the photomechanical actuator comprises an actuator from at least one of the following groups: a) polarized photomechanical actuators, b) liquid-crystal-based photomechanical actuators, c) photomechanical actuators based on optothermal transitions, d) charge-induced photomechanical actuators and e) photomechanical actuators based on radiation pressure.

Polarized photomechanical actuators are optomechanical actuators that exhibit a light-induced mechanical deformation when they are irradiated with polarized light. One example of a material that exhibits such an effect is a glass, that is to say an amorphous solid, which comprises one or more elements from the group of chalcogens. Liquid-crystal-based photomechanical actuators have already been demonstrated, for example, for nematic elastomers. For example, it has been possible to demonstrate for polymer networks which contain azobenzene liquid crystalline fragments that the nematic order can be suppressed or restored by optomechanical actuation. That is to say that optical irradiation can, for example, deform the azobenzene polymer films on the basis of the liquid-crystalline order.

Optothermal transitions are substantially the direct optical equivalent of electrothermal transitions and are based on parts of the energy of the excitation light being absorbed by the medium and converted into thermal energy. Generally, in addition to the other photoactuating effects, photoactuators always also have at least an element of the actuation mechanism based on optothermal transitions.

In the case of charge-induced photomechanical actuators, photons are absorbed in a semiconductor, free electrons are excited from the valence band into the conduction band and this leaves holes in the lattice, which cause a local mechanical strain in the material.

Photomechanical actuators based on radiation pressure are based on the momentum transfer between light and the actuator structure. These physical principles are only some of those possible that cause a photoactuator to change a strain and/or stress of the actuator layer. Other possible effects are conceivable, for example the photoactuator may comprise a shape-memory polymer that is optically activated or a nanostructure that has stresses due to local uneven distribution of photon-generated charges.

In one embodiment, the photoactuator comprises at least one material belonging to one of the following groups:
  liquid-crystalline materials, in particular liquid-crystal elastomers
  photoisomerizable organic compounds, specifically azo compounds, for example azobenzenes, and also photochromic organic compounds, in which the photochromic color change is combined with an isomerization of an isomer with an open ring to an isomer with a closed ring, for example fulgides, hexatrienes, diarylethenes, dithienylcyclopentenes, preferably photochromic diarylethenes, in particular photochromic diarylethene single crystals, or cocrystals of photochromic diarylethenes, for example 1,2-bis(2-methyl-5-(1-naphthyl)-3-thienyl)perfluorocyclopentenes, with compounds comprising perfluorinated condensed ring systems, for example perfluoronaphthaline, in particular cocrystals of 1,2-bis(2-methyl-5-(1-naphthyl)-3-thienyl)perfluorocyclopentenes with perfluoronaphthaline spin-crossover materials, in particular spin-crossover complexes, for example an [Fe(L){M(CN)4}] scaffold, wherein L is a ligand, for example a heteroaromatic compound with at least one nitrogen atom in the aromatic ring structure, for example pyrazine or 3-cyanopyridine, and M is a metal, for example Pt or Au, for example $\{Fe(3\text{-}CNpy)[Au(CN)_2]_2\}*2/3H_2O$ carbon nano objects, in particular carbon nano tubes (single-walled and multi-walled), carbon nano fibers and graphene, nano composites comprising carbon nano tubes, in particular multi-walled carbon nano tubes MWCNT and/or graphene, in a matrix, preferably an elastic matrix, in particular an elastic polymer matrix, for example a matrix comprising polydimethylsiloxane PDMS or a matrix comprising liquid-crystal elastomers, or a matrix comprising a shape-memory polymer laminates comprising a film of carbon nano tubes combined with an elastomer film, for example a film containing an acrylic elastomer photoresponsive polymers, for example in the form of light-sensitive hydrogels, in particular hydrogels of covalently crosslinked copolymer networks of a thermoresponsive polymer and a chromophore biological photoresponsive molecules, for example photoresponsive proteins, for example, bacteriorhodopsin chalcogenide glasses, for example $As_{50}Se_{50}$ ferroelectric materials, for example ferroelectric single crystals, and ferroelectric polycrystalline materials, for example polarized ferroelectric ceramic, for example lanthanum-modified lead zirconate titanate (PLZT), and doped lanthanum-modified lead zirconate titanate, for example lanthanum-modified lead zirconate titanate doped with $WO_3$ polar semiconductors rotaxanes optically activatable piezo crystals.

The use of these and other materials as photoactuators, to name just a few examples, is known from the book "Optical Nano and Micro Actuator Technology" (CRC Press 2012), from the publications Iwaso et al., "Fast response dry-type artificial molecular muscles with [c2] daisy chains", Nature Chemistry, Vol. 9, June 2016, 625-631 doi: 10.1038NCHEM.2513; Shepherd, H. J. et al. "Molecular actuators driven by cooperative spin-state switching" Nat. Commun. 4:2607 doi: 10.1038/ncomms3607 (2013) and Morimoto et al., "A Diarylethene Cocrystal that Converts Light into Mechanical Work", Journal of American Chemical Society 2010, 132, 14172-14178.

DE 10 2008 037 447 A1 describes a blade (20) of a wind power installation which contains a sensor arranged upstream of a trailing edge of the blade for detecting a characteristic of the air stream near the surface of the blade and an actuator arranged downstream of the sensor for setting the air stream in response to the measured characteristic.

DE 10 2010 006 544 B4 discloses a rotor blade, in particular for a wind power installation, which has at least one mass actuator comprising an actuator and a mass, and wherein the mass can be moved linearly or arcuately in a pendular motion, characterized in that the mass actuator is formed with a sensor and a controller (9) as a unit that can be handled independently.

EP 2 899 395 B1 discloses a wind turbine blade comprising a deformable trailing edge section extending chordwise and spanwise, wherein the deformable trailing edge section is split into a suction side subsection and a pressure side subsection by one or more slits, wherein the deformable trailing edge section comprises one or more actuators acting on at least one of the subsections corresponding to the suction side and the pressure side, and wherein the slits are configured to allow a sliding movement of the subsections with respect to one another or with respect to an intermediate structure arranged between the subsections, and the subsections corresponding to the suction side and the pressure side and the actuators are arranged in such a way that the deformation of one of the subsections is associated with a substantially corresponding deformation of the other subsection.

EP 2 495 434 B1 relates to a system for monitoring the state of rotor blades on wind power installations. In the system, multiple sensor nodes are attached to a rotor blade or integrated in the rotor blade. At individual sensor nodes there is in each case at least one sensor for the spatially resolved detection of vibrations and/or acoustic waves of the rotor blade, and the sensor nodes are connected to a central supplying and receiving unit by optical fibers. At the central supplying and receiving unit there is a light source, from which electromagnetic radiation is passed via an optical fiber to a photovoltaic converter, with which the electromagnetic radiation received is converted into electrical energy.

DE 10 2013 006 166 A1 relates to a form-variable, fluidically actuated trailing edge on aerodynamic profiles of rotor blades of wind power installations which comprises a basic structure, preferably with in each case a flexible upper side and underside, and also at least one fluidically, preferably pneumatically, operated actuator element moving the said basic structure, characterized in that the actuator element changes its extent in a way similar to a bellows by folding of its wall, this wall locally dictating the shape of the profile outer contour and preferably lying in the enveloping curve of the underlying aerodynamic profile, and this wall forming the sealing of the inner profile space with respect to the surroundings of the profile between the movable part and the fixed part of the profile.

DE 197 12 034 A1 comprises a profile edge of an aerodynamic profile, wherein the profile edge comprises multifunctional material on its outer side and/or inner side or on its structure.

EP 3 128 169 A1 relates to an actuator arrangement for moving an aerodynamic device relative to a rotor blade of a wind turbine, the actuator arrangement comprising: an attachment portion, which is arranged and prepared for attaching the actuator arrangement at the trailing edge section of the rotor blade; a connection portion, which is arranged and prepared for connecting the aerodynamic device to the actuator arrangement; a hinge portion, which connects the attachment portion and the connection portion, wherein the hinge portion allows a relative movement of the connection portion with respect to the attachment portion about a rotational axis which is oriented in the substantially spanwise direction of the rotor blade; and a pneumatic actuator for inducing the rotational movement of the connection portion relative to the attachment portion, wherein the movement is a reversible movement. The actuator arrangement is characterized in that it is arranged and prepared for detachably connecting the aerodynamic device to the connection portion. Furthermore, provided is a movable trailing edge arrangement (40) comprising such an actuator arrangement and an aerodynamic device. Also provided is a rotor blade arrangement with such an actuator arrangement and a rotor blade of a wind turbine.

DE 10 2010 047 918 A1 describes various technical implementations of the concept of the pneumatically actuated, operationally reliable flexible trailing edge. All of the variants described are based on the basic principle of the use of pneumatic muscles and counteracting mechanical energy stores, in order to deflect a deformable and elastic aerodynamic structure. The successful implementation of such a variant allows the effective aerodynamics, the wind loads and the precise power control of rotors of wind power installations to be regulated.

In one embodiment, the actuator layer is anisotropic in at least one direction. Since the actuator layer is anisotropic in at least one direction, not all of the characteristics of the actuator layer are dependent on a direction. In particular, the anisotropy preferably has the effect that the photoactuator or the actuator layer forms the preferential direction.

In one embodiment, the actuator layer comprises a fiber composite. A fiber composite preferably has two main components, to be specific a bedding matrix and reinforcing fibers. The fibers comprise, for example, glass fibers, carbon fibers, ceramic fibers, etc., without being restricted thereto. The material of the embedding matrix may comprise, for example, polymers such as thermosets, elastomers or thermoplastics, but also other elements such as cement, metals, ceramics, etc., without being restricted thereto. Such materials can be advantageously used particularly in the area of wind power installations.

In one embodiment, the photoactuator in the actuator layer is embedded in a matrix, in particular a resin matrix. The term resin refers to solid to liquid organic substances. In particular, resin refers to polymers as the base material for plastics. By means of a matrix, photoactuators can be embedded in the actuator layer in an advantageous form.

In one embodiment, the actuator component has at least two actuator layers with at least one exciting layer respectively lying in between.

The arrangement in multiple layers is comparable to the known arrangement of a piezo stack. If the actuator component has many actuator layers lying one on top of the other, a preferential direction can be advantageously realized in the stacking direction. The actuator displacement is then proportional to the number of layers and can be advantageously scaled to certain extents.

However, the preferential direction does not have to correspond to the stacking direction in every embodiment. In particular in the case in which the actuator component comprises two actuator layers with an exciting layer lying in between, the preferential direction may also lie in the plane of the actuator layers or of the exciting layer. Preferably, in this case the two actuator layers have different reactions to excitation light, for example the one exciting layer undergoes an extension under strain in the preferential direction, while the other exciting layer undergoes a compression in the preferential direction. This results in a bending of the actuator component. In other embodiments, the actuator layers may however also have the same reaction, resulting in an extension of the overall actuator component in the preferential direction in the plane of the layers.

In further embodiments, it is also possible for more than one exciting layer to be provided between two actuator layers. In this case, different excitation light can be introduced into the respective actuator layers.

In one embodiment, the actuator component is designed to apply by means of excitation light a force of 10 to 50 newtons per square millimeter (N/mm$^2$) of the cross-sectional area of the actuator component, wherein the cross-sectional area of the actuator component is perpendicular to the preferential direction.

A force in newtons per square millimeter of cross-sectional area corresponds to a pressure in megapascals; the range of 10 to 50 N/mm$^2$ is a value that is widely used for piezo actuators and allows applications in many areas, in particular of wind power installations.

Preferably, the cross-sectional area of the actuator component perpendicularly to the preferential direction is referred to as the actuator area and is preferably determined as the area of the entire actuator component, including the actuator layer and the exciting layer.

For a stack actuator, the actuator area is consequently preferably independent of the number of layers and corresponds to the surface area of one of the corresponding layers.

In one embodiment, the actuator component is configured as an extension actuator component, wherein a direction of extension corresponds to the preferential direction, which is substantially perpendicular to the at least one actuator layer, or the actuator component is configured as a bending actuator component, wherein the direction of extension is substantially perpendicular to the preferential direction of the actuator layer.

Extension actuator components allow a preferably linear mechanical deformation, wherein this linear mechanical deviation can be transformed, for example, into movement of another component. Preferably, the stack-like construction of the actuator component corresponds to an extension actuator component, wherein the linear extension displacement in this example corresponds to the stacking direction. An extension actuator component may in one embodiment be designed for activating a lift flap of a rotor blade of a wind power installation.

As a difference from this, a bending actuator component is designed to bend the actuator component in a direction of extension or deflection perpendicular to the preferential direction. The bending actuator component is preferably configured as a two-dimensional actuator component, which extends over a relatively great region of the component to be controlled. The preferential direction runs substantially in the plane in which the actuator component has its two-dimensional extent. Here, there may comprise in one embodiment one or more actuator layers and/or exciting layers lying in the plane, wherein the preferential direction then lies in the actuator layer, or in another embodiment multiple stacked layers perpendicular to the plane, wherein the preferential direction is then perpendicular to the plane of the respective actuator layers. The bending actuator component preferably has a small extent perpendicularly to the plane in which it has its two-dimensional extent in comparison with its other dimensions.

In one embodiment, such a bending actuator component is designed for controlling a servo flap of a rotor blade of a wind power installation. By contrast with the extension actuator component, the bending actuator comprises a much smaller number of actuator layers, or exciting layers, at least in the case where the layers are arranged parallel to the plane in which the bending actuator component has its two-dimensional extent, and takes up a greater surface area while being of a comparable volume.

In one embodiment, a ratio of the actuator area to a square of a reference length of the actuator component lies in a range of 0.0001 to 0.01 and, in particular in the case where the actuator component is configured as an extension actuator component, lies in a range of 0.01 to 1.

Referred to as a reference length of the actuator component is the ratio of the actuator displacement and the extension displacement. If, for example, an actuator is designed in such a way that an actuator displacement of 0.1 mm is required, which allows an extension under strain of 0.1%, this results in a reference length of 100 mm. This is of course an example, and the actual design of the actuator may be based on actual requirements.

The range of 0.01 to 1 for the ratio of the actuator area to a square of the reference length corresponds to a range such as that required in particular for lift flaps on wind power installations. The range of 0.0001 to 0.01 corresponds to a range such as that used in particular for the design of servo flaps for wind power installations.

In one embodiment, mechanical work that can be performed by the actuator component lies in a range of 100 to 10 000 joules per cubic meter ($J/m^3$) of actuator volume, wherein in particular in the case where the actuator component is configured as an extension actuator component the mechanical work that can be performed by the actuator component lies in a range of 1000 to 10 000 joules per cubic meter of actuator volume or in the case where the actuator component is configured as a bending actuator component lies in a range of 100 to 1000 joules per cubic meter of actuator volume.

Referred to as the actuator volume is the volume of the actuator component, wherein the actuator volume preferably comprises at least the actuator layer and the exciting layer. The mechanical work that can be performed in a range of 100 to 10 000 $J/m^3$ is possible in particular for the examples of photoactuators mentioned at the beginning, and can be achieved depending on the design of the actuator component.

Generally, the achievable energy density in the case of surface actuators is lower by approximately a factor of 10 than for a stack actuator. The range of 100 to 1000 $J/m^3$ of actuator volume can preferably be used for the activation of servo flaps of wind power installations. The range of 1000 to 10 000 $J/m^3$ of actuator volume is preferably designed for activating a lift flap of a wind power installation.

In one embodiment, the actuator component is configured as a bending actuator component and is designed to bend by excitation perpendicular to the preferential direction.

The bending actuator component is consequently preferably designed for bending perpendicularly to the plane of the preferential direction. In particular, the preferential direction lies in the plane in which the bending actuator component has a two-dimensional extent, for example is attached to a substrate or a surface of a component. As a result, a two-dimensional actuator component that directly brings about a deformation of the surface area to which the actuator is attached can be designed. The bending actuator component preferably corresponds in its operating principle to a bimetallic actuator and may be formed in a similar way. In one configuration of the bending actuator component, the preferential direction lies in the plane of the actuator layer, that is to say the one or more actuator layers run substantially parallel to the surface area on which the actuator is attached. In another configuration, the bending actuator component is made up of many layers, which run(s) substantially perpendicularly on the surface area on which the actuator is attached. In this case, the preferential direction also runs substantially perpendicularly to the parallel plane of the multiple actuator layers.

In one embodiment, a ratio of a height of the actuator component to a length of the actuator component in the preferential direction lies in a range of 0.001 to 0.1, in particular in a range of 0.002 to 0.02.

In this embodiment, the plane of the actuator layer spans the preferential direction and a direction perpendicular thereto. The mechanical work that can be performed by the actuator component is proportional to the width of the actuator component, which is perpendicular to the preferential direction. To put it another way, a differential contribution of the actuator component in the widthwise direction is constant and is preferably already determined by the ratio of the height to the length in the preferential direction. Actuator components in which this ratio lies in the preferred range are particularly well-suited for use on rotor blades of wind power installations.

For the example of a servo flap of a rotor blade of a wind power installation, the preferential direction may correspond to the direction of the profile of the rotor blade. The servo flap may then be provided, for example, with a certain length in the direction of the profile chord into the region of the trailing edge of the rotor blade of the wind power installation. The mechanical work to be performed for activating the servo flap is proportional to the width of the flap in the direction of the radius of the rotor blade, i.e., the work per unit in the widthwise direction is substantially constant over the radius of the rotor blade of the wind power installation from the hub to the tip of the blade. For example, such a servo flap may have a width of one meter. Since both the mechanical work that can be performed by the actuator component and the mechanical work that is required by the servo flap are proportional and depend linearly on the width of the actuator and of the servo flap, it is sufficient to specify the length of the actuator component and its height. The volume of the actuator component and the mechanical work that can be performed by it can be obtained by multiplying by the length, which corresponds to the length of the servo flap.

In one embodiment, a height of the actuator component perpendicularly to a plane of the at least one actuator layer lies in a range of 1 mm to 10 mm, preferably in a range of 3 mm to 7 mm and particularly preferably of approximately 5 mm.

Preferably, the term approximately should be understood as a rounding inaccuracy, that is to say that the range of 4.5 to, for example, 5.49 mm is to be understood as approximately the value of 5 mm. A height of the actuator component that lies in the preferred range meets the requirements particularly for use in the area of wind power installations.

In one embodiment, the exciting layer comprises ultra-thin glass and/or polymer, in particular with a thickness of 20 μm to 100 μm.

Ultra-thin glass and/or polymer is of course only one example of a material that may be contained in the exciting layer. Other suitable materials are also conceivable. Ultra-thin glass or polymer advantageously allows that the exciting layer has the desired properties in spite of the very small thickness.

In one embodiment, the actuator component has a mirror coating, which is designed to reflect the excitation light, wherein the mirror coating at least partially surrounds the actuator component on at least one side face, in particular surrounds the actuator component on the side of the exciting layer that is opposite from the actuator layer.

Preferably, the mirror coating is designed for the wavelength of the excitation light. As a result of the mirror coating, it is possible to reduce light losses, for example due to excitation light escaping from the exciting layer instead of being guided into the actuator layer. In this way, an efficiency of the overall actuator component increases.

In one embodiment, the light guide is arranged in such a way as to introduce light into the exciting layer in a longitudinal direction, wherein the longitudinal direction lies in a plane of the exciting layer, wherein the plane of the exciting layer is defined by the longitudinal direction and the widthwise direction, wherein in particular the preferential direction substantially corresponds to the longitudinal direction or a direction deviating therefrom that lies in a plane of the at least one actuator layer in a case in which the actuator component is configured as a bending actuator component, or the preferential direction is substantially perpendicular to the longitudinal direction and/or the plane of the at least one actuator layer in a case in which the actuator component is configured as an extension actuator component.

The fact that the longitudinal direction lies in a plane of the exciting layer means that it is particularly easy to introduce light into the layer by means of the light guide. In other embodiments, the longitudinal direction may also be defined as a direction of the exciting layer, wherein one or more light guides introduce light into the exciting layer in the plane of the exciting layer, wherein the directions with which the light guide or light guides introduce light do not necessarily correspond to the longitudinal direction.

Preferably, in this embodiment a different effect of the photoactuator is used depending on whether the actuator component is configured as a bending actuator component or as an extension actuator component. To be specific, preferably a transversal effect of the photoactuator is used in the case of the bending component and a longitudinal effect of the photoactuator is used in the case in which the actuator component is configured as an extension actuator component. The transversal effect is comparable to the transverse effect, or d31 effect, known for piezo actuators and the longitudinal effect is comparable to the linear effect, or d33 effect. These are also just configurations that are mentioned by way of example; other effects, for example a shear effect or a combination of a transversal effect and a longitudinal effect, can also be used in other embodiments.

In one embodiment, the actuator device also has an amplification frame, which encloses the actuator component, wherein the amplification frame is arranged in such a way that an extension of the actuator layer in the preferential direction leads to a compression of the amplification frame perpendicularly to the preferential direction, wherein the amplification frame is designed for transformation between the movement in the preferential direction and substantially perpendicularly thereto.

In other words, such an amplification frame implements a displacement increasing system, with which displacement of the actuator can be transformed into a longer displacement in terms of movement. In particular in the case in which the actuator component has multiple layers, or is formed as a stack actuator, the achievable actuating displacements of the actuator component can be increased by means of the amplification frame in such a way that it is particularly suitable for applications in the wind power installation.

The mechanical energy that can be produced by the actuator is not changed by the transformation. Correspondingly, when there is an increased displacement distance, the force that can be applied over each displacement distance is reduced correspondingly. A transformation factor of an amplification frame lies in a range of 2 to 10, in particular at approximately 5, without being restricted thereto.

In one embodiment, the exciting layer has on the side or sides adjacent to the actuator layer at least one diffusion element for the diffuse introduction of excitation light into the actuator layer, wherein the diffusion element comprises in particular surface irregularities, preferably lasered and/or etched microcavities.

Preferably, the diffusion element achieves a uniform distribution of the excitation light in the actuator layer. In other embodiments, the diffusion element may alternatively or in addition be formed as an independent layer between the exciting layer and the actuator layer, or as part of the actuator layer. Other diffusion elements that are not based on surface irregularities are also conceivable.

In one embodiment, the exciting layer has a conversion element, which is designed for converting light from the light source into excitation light, wherein the excitation light has a different wavelength and/or a different spectrum than the light of the light source.

By means of a conversion element, it is not necessary that the light of the light source is adjusted exactly for the photoactuator. Consequently, even in the case in which light from the light source is not suitable as excitation light, the photoactuator can be excited once the light is converted into excitation light by the conversion element.

In one embodiment, the conversion element comprises a fluorescent or phosphorescent material. In particular when a phosphorescent material is used, an excitation of the photoactuator can consequently also take place after the irradiation by the light source is switched off. These materials are only examples however; other conversion elements are conceivable. Also, the conversion element as part of the exciting layer should only be understood as being mentioned by way of example, while in other embodiments an independent conversion element may be formed between the exciting layer and the actuator layer, or the conversion element may be formed as part of the actuator layer.

In a further aspect, a rotor blade of a wind power installation with an actuator device according to an embodiment of the invention and an active element is provided, wherein the actuator device is designed for controlling the active element.

The rotor blade with an actuator device described herein consequently makes it possible that the active element that is provided on the rotor blade can be controlled without it having to be connected to electrical lines. All of the other benefits and advantages of the embodiments mentioned of the actuator device can also be transferred in the same way to the rotor blade. The active element preferably comprises a lift flap, a servo flap, a vortex generator or some other active element with which, for example, aerodynamic and/or acoustic properties of the rotor blade can be changed.

In one embodiment of the rotor blade, the actuator component of the actuator device is configured as a bending actuator component and the flap is configured as a servo flap, wherein the actuator component is mounted in surface contact over the region of the servo flap.

A servo flap is preferably a form-variable active element, that is to say that, by actuation, the servo flap itself changes in its shape, for example bends. The servo flap is preferably provided in a region of the blade tip of the rotor blade and comprises a region of 10 to 20% of the rotor blade profile, as seen from the trailing edge. The region of the blade tip comprises in particular the outer 30% of the length of the rotor blade in the radial direction, as seen from a rotor blade hub, while a servo flap may be provided a length in the direction of the radius of the rotor blade in the entire region of the blade tip or only in a partial region, for example of the order of magnitude of 1 m to 10 m.

The actuator force of the servo flap must be applied in a substantially evenly distributed manner over the entire region of the servo flap. For this reason, it is preferred that as large a region of the servo flap as possible is covered by the actuator device, which is configured as a bending actuator. This of course does not have to be a single two-dimensional actuator component; instead, multiple individual actuator components, which correspondingly cover parts of the servo flap and in each case have an independent control component, are also conceivable. The servo flap may, for example, be configured as a central layer of a bendable material, for example glass-fiber-reinforced plastic, wherein at least one bending actuator component is formed on the upper side and/or the underside of the central layer. For the shaping, an elastic material may also be formed over the central layer and the actuator component.

In one embodiment of the rotor blade, the actuator component of the actuator device is configured as an extension actuator component and the flap is configured as a lift flap, wherein the rotor blade also has a transforming unit for transforming the movement of the actuator component into a control of the lift flap.

A lift flap is preferably a discrete component, with, for example, an extent of 15 to 50% in the depthwise direction of the profile. The position of the lift flap is changed with respect to the rotor blade by means of the actuator device. For example, the lift flap is turned with respect to the rotor blade, in order to increase or reduce a lift. The transforming unit has in one embodiment a push/pull rod, with which the actuator movement is transformed into a movement of the lift flap as in the case of known lift flaps. Since the actuator device is configured as an extension actuator component, the extension actuator component produces a linear actuator movement, which can be easily transformed by the transforming unit.

In one embodiment of the rotor blade, the actuator device has an amplification frame, which encloses the actuator component, wherein the transforming unit has a push/pull rod for coupling the amplification frame to the lift flap.

The fact that the actuator unit has the amplification frame allows the shortest possible actuator displacement to be transformed into a longer movement of the amplification frame. Typical transformation ratios that can be achieved with such an amplification frame lie in the range of 2 to 10, that is to say that the actuator displacement can be increased in length by up to 2 to 10 times. Other transformations are also conceivable, for example multiple transforming devices, for example amplification frames, may also be connected in series. Instead of the push/pull rod or in addition thereto, the transforming unit may also comprise further elements in order to transform the movement of the actuator component into the control of the lift flap.

In a further embodiment, the rotor blade of the wind power installation has multiple active elements. The multiple active elements may, for example, be multiple lift flaps, multiple servo flaps, vortex generators or other active elements. In a further embodiment, a combined servo flap and lift flap may also be provided on the rotor blade. Respectively suitable configurations of the actuator device can then be used for the respective active element, or the combination of active elements.

In a further aspect, a wind power installation with a rotor blade according to an embodiment of the invention is provided.

In a further aspect, a method of assembly for assembling an actuator device according to an embodiment of the invention on a rotor blade according to an embodiment of the invention is provided, wherein the method comprises attaching the actuator component to a rotor blade of a wind power installation and/or connecting the control component to the actuator component.

It should be understood that the actuator device as claimed in claim 1, the rotor blade as claimed in claim 25, the wind power installation as claimed in claim 26 and the method of assembly as claimed in claim 27 have similar and/or identical preferred embodiments, as defined in particular in the dependent claims.

BRIEF DESCRIPTION OF THE SEVERAL VIEWS OF THE DRAWINGS

The present invention is now explained in more detail below by way of example on the basis of exemplary embodiments with reference to the accompanying figures.

DETAILED DESCRIPTION

Figure 1A:
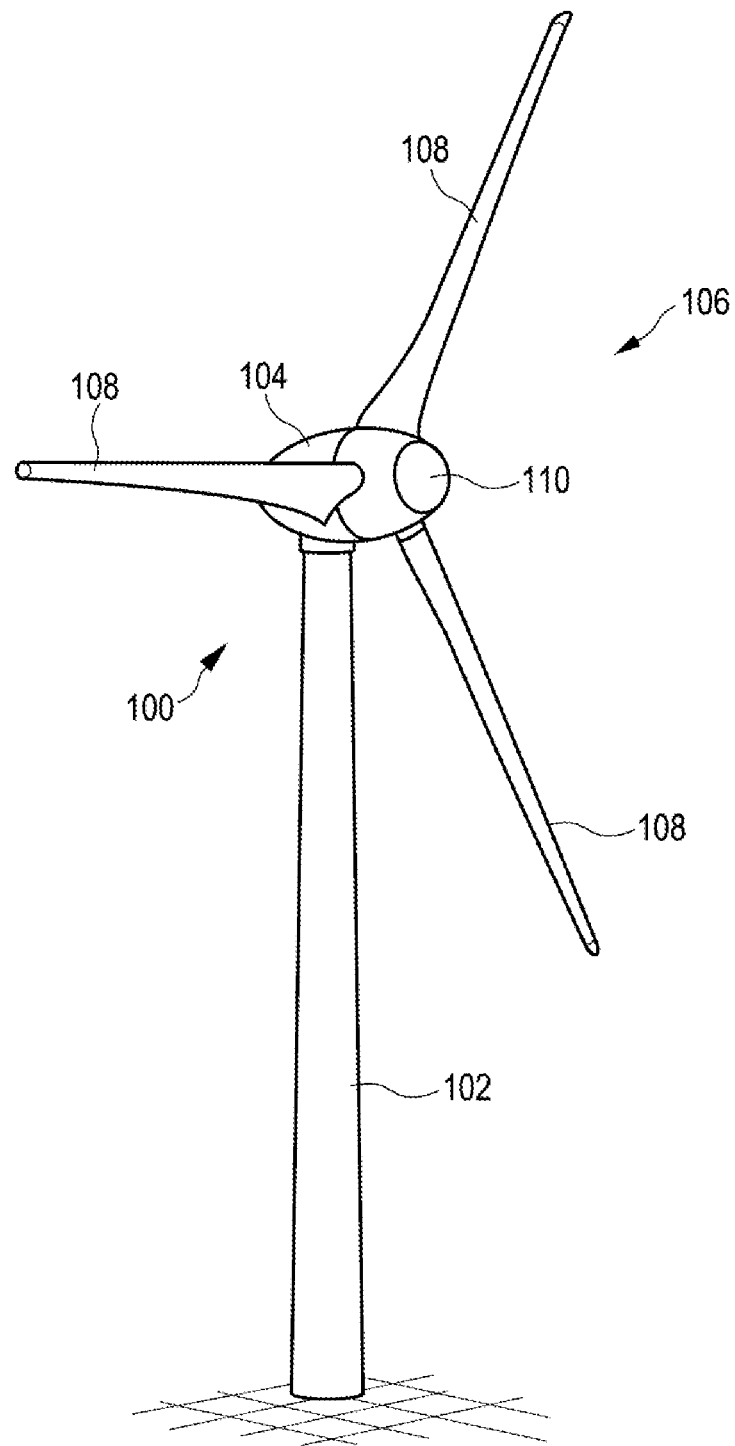
FIG. 1*a* shows a schematic view of a wind power installation.

FIG. 1*a* shows a wind power installation 100 with a tower 102 and a nacelle 104. Arranged on the nacelle 104 is a rotor 106 with three rotor blades 108 and a spinner 110. During operation, the rotor 106 is set in a rotational movement by the wind and as a result drives a generator in the nacelle 104.

Figure 1B:
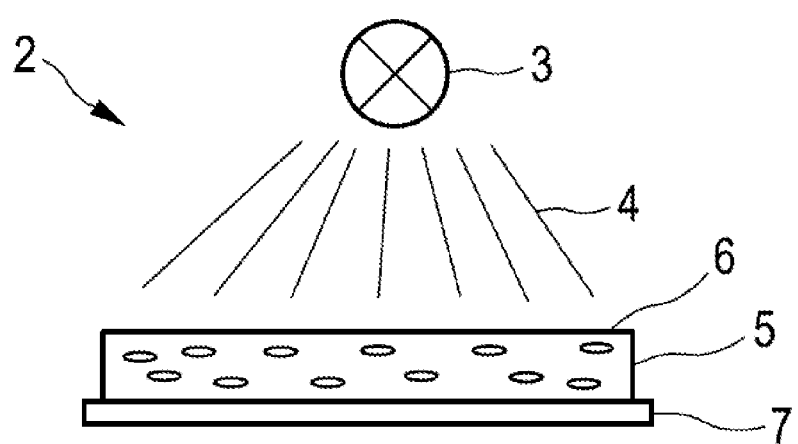
FIG. 1*b* shows a schematic view of a known actuator device.

FIG. 1*b* shows a schematic view of a known actuator device 2, in the case of which excitation light 4 is guided onto an active layer 5 by means of a light source 3. The active layer 5 comprises a photoactuator 6, which brings about an extension under strain of the actuator layer 5 on the basis of the excitation light 4. The actuator layer 5 is attached on a substrate 7. The induced extension of the actuator layer 5 can, for example, cause the layer 5 including the substrate 7 to bend. The irradiation of excitation light 4 from the light source 3 takes place in the known example two-dimensionally and directly over the entire actuator layer 5, without use of a light guide or the like.

Figure 2:
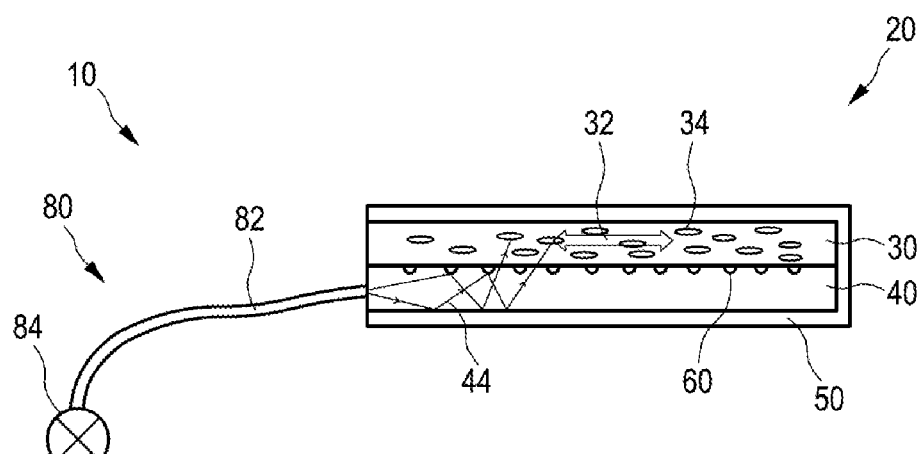
FIG. 2 shows a schematic view of an exemplary embodiment of an actuator device.

FIG. 2 shows schematically and by way of example an actuator device 10, for example for a wind power installation 100, as shown in FIG. 1a. The actuator device 10 has an actuator component 20 and a control component 80. The control component 80 is preferably formed in such a way that it controls the actuating mechanism of the actuator component 20.

The actuator component 20 has in this example an actuator layer 30 with a preferential direction 32, shown horizontally in the example. The actuator layer 30 has a photoactuator 34, which is designed to change a strain and/or stress of the actuator layer 30 in the preferential direction 32, in dependence on light that is irradiated into the actuator layer 30. The actuator layer 30 is, for example, a resin matrix with embedded anisotropic crystals as a photoactuator 34. The preferential direction 32 and the photoactuators 34 are of course only chosen by way of example; in other exemplary embodiments, other materials are conceivable and/or other preferential directions are conceivable. Substantially parallel to the actuator layer 30, the actuator component 20 also has an exciting layer 40. The exciting layer 40 is designed to guide excitation light 44 into the actuator layer 30. In the example of FIG. 2, the exciting layer 40 guides excitation light 44 over the entire length of the actuator component 20 and the actuator layer 30 that corresponds to the preferential direction 32. The exciting layer 40 may, for example, comprise ultra-thin glass or a polymer and be formed with a thickness of preferably 20 to 100 μm.

The control component 80 has a light guide 82 and a light source 84. The light source 84 is arranged away from the actuator component 20 and the light guide 82 is designed for guiding light emitted by the light source 84 into the exciting layer 40. The light source 84 may be designed to emit light of one or more wavelengths. The wavelengths of the emitted light preferably correspond to one or more wavelengths of light that is suitable for activating the photoactuator 34. In other exemplary embodiments, the wavelength of the light emitted by the light source 84 may also deviate from the wavelength that the photoactuator 34 requires for activation. For example, a conversion element (not shown) may then be provided in the exciting layer 40, for example an element that comprises a fluorescent or phosphorescent material.

Shown in FIG. 2 is a mirror coating 50, which encloses the actuator component 20 on multiple side faces and is designed to reflect the excitation light 44. The mirror coating 50 ensures that a large part of the light introduced into the exciting layer by way of the light guide 82 can be used for exciting the actuator layer 30. In other exemplary embodiments, the mirror coating 50 is only provided partially, in particular on the side of the exciting layer 40 that is opposite from the actuator layer 30.

Also shown in FIG. 2 is a diffusion element 60, which is provided between the actuator layer 30 and the exciting layer 40 and is designed to introduce excitation light 44 diffusely into the actuator layer 30. The diffusion element 60 may, for example, be formed as surface irregularities of the exciting layer 40, in particular as lasered and/or etched microcavities. In other exemplary embodiments, the diffusion element 60 may also be formed as part of the actuator layer 30 or as an independent element.

Figure 3:
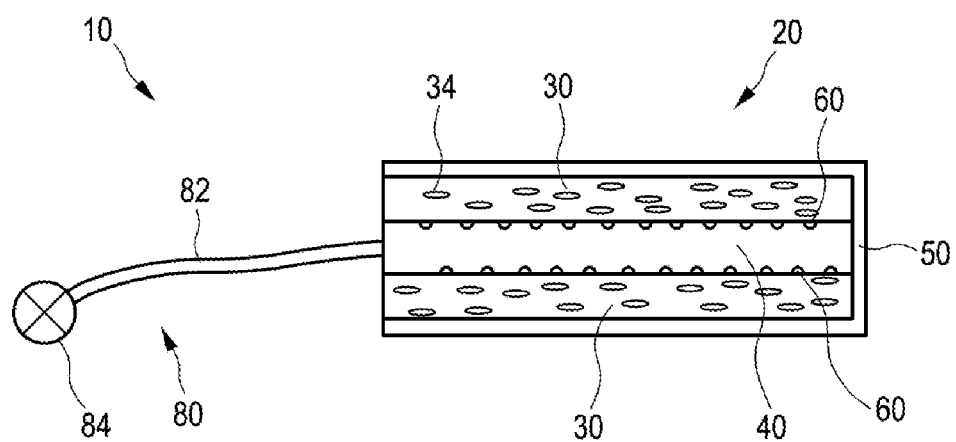
FIG. 3 shows a schematic view of a further exemplary embodiment of an actuator device.

FIG. 3 shows schematically and by way of example a further exemplary embodiment of an actuator device 10. The actuator device shown in FIG. 3 has two parallel actuator layers 30 with an exciting layer 40 lying in between. Light from the exciting layer 40 can consequently enter one of the two actuator layers 30 either in the upward or downward direction. The actuator layers 30 may either be the same or different from one another, for example comprise photoactuators that have the same or different excitation characteristics. The preferential direction of the two actuator layers 30 may be the same or different.

Figure 4:
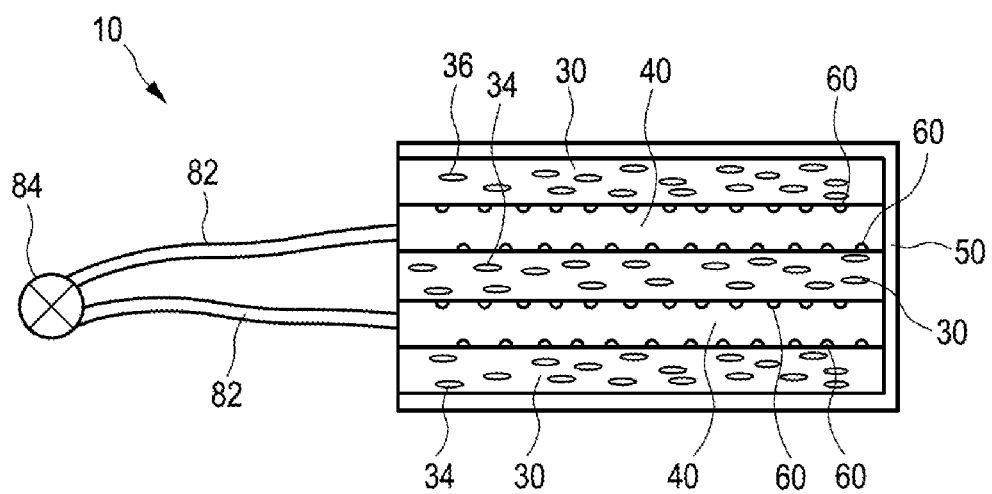
FIG. 4 shows a schematic view of a further exemplary embodiment of an actuator device.

FIG. 4 shows schematically and by way of example a further exemplary embodiment of an actuator device 10 with three actuator layers 30 and, parallel thereto, two exciting layers 40 lying in between. Each of the exciting layers 40 is connected to the light source 84 by way of a light guide 82. In further examples, any desired number of arrangements of actuator layers 30 and exciting layers 40 stacked in this way may be created. With this form of stacked layer arrangements, the preferential direction preferably runs along the stacking direction, so that the stack becomes thicker or thinner when the actuator layer 30 or the actuator layers 30 is/are excited. Consequently, to be specific, the actuator displacement of an individual actuator layer 30 can be increased over the entire actuator device 10, since a contribution to the increase, that is to say an extension, of the actuator component 20 occurs for each of the actuator layers 30.

Figure 5A:
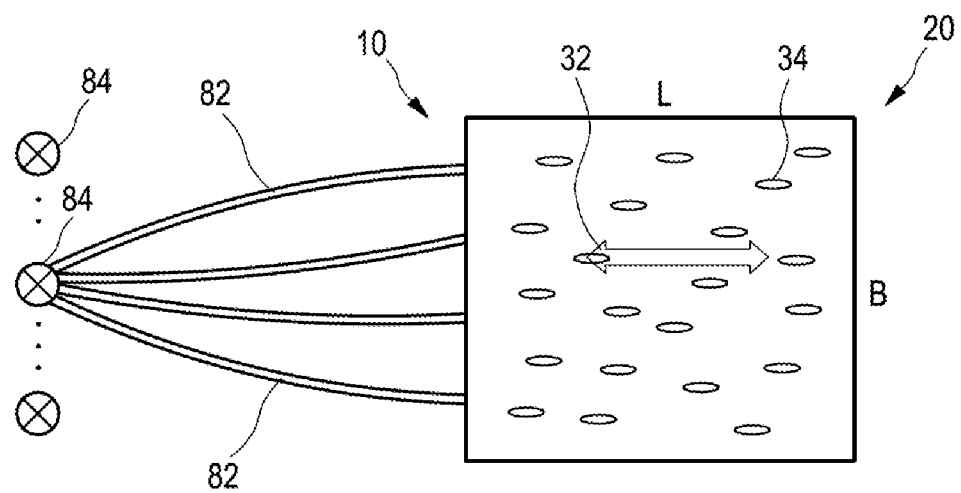
FIGS. 5*a* and 5*b* show schematic plan views of an exemplary embodiment of an actuator device.
Figure 5B:
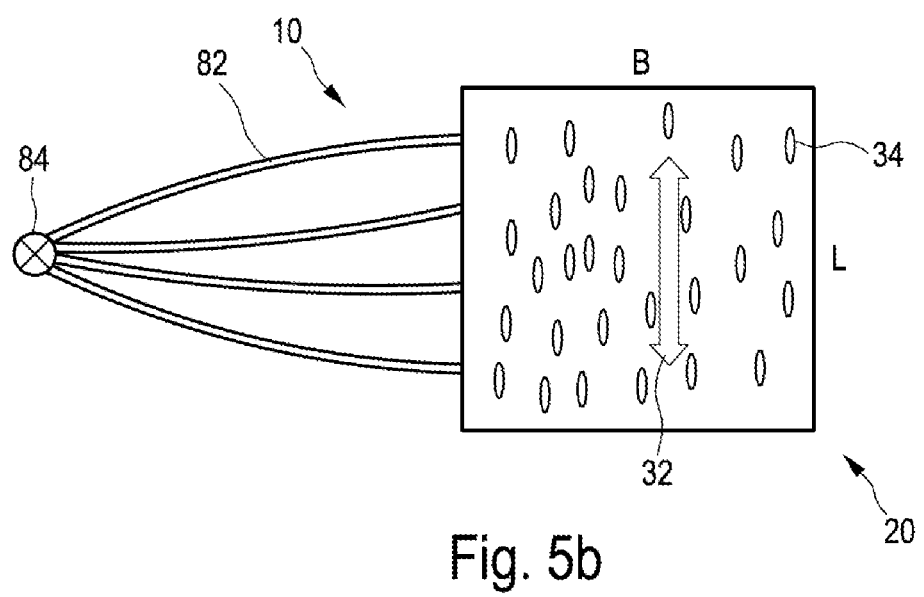

FIGS. 5a and 5b show schematically and by way of example plan views of an actuator device 10 or an actuator layer 30 with a photoactuator 34 thereof. FIG. 5a differs from FIG. 5b in the preferential direction, or the anisotropy of the photoactuator 34. L denotes the direction of extension of the actuator component 20, which corresponds to the preferential direction 32 in which the actuator layer 30 undergoes an extension or compression when it is excited. Shown perpendicularly thereto is the width B, which substantially undergoes no change. FIG. 5a shows the case in which the introduction of light by means of the light guide 82 takes place in a distributed manner over the widthwise direction B, that is to say the extension in the preferential direction 32 takes place in the direction of the introduction of the light 82. In the other case, shown in FIG. 5b, the introduction of light is brought about by means of the light guide 82 over the longitudinal direction L of the actuator component 20, that is to say the extension in the preferential direction 32 takes place perpendicularly to the introduction of the light.

Combinations of the light being introduced both in the lengthwise direction and in the widthwise direction are also conceivable. In other exemplary embodiments, the actuator component 20 is invariant in response to activation both in the longitudinal direction L and in the widthwise direction B, and the enumeration takes place perpendicularly thereto, for example in the direction of the thickness of the stack of layers shown in FIG. 3 or 4.

Figure 6:
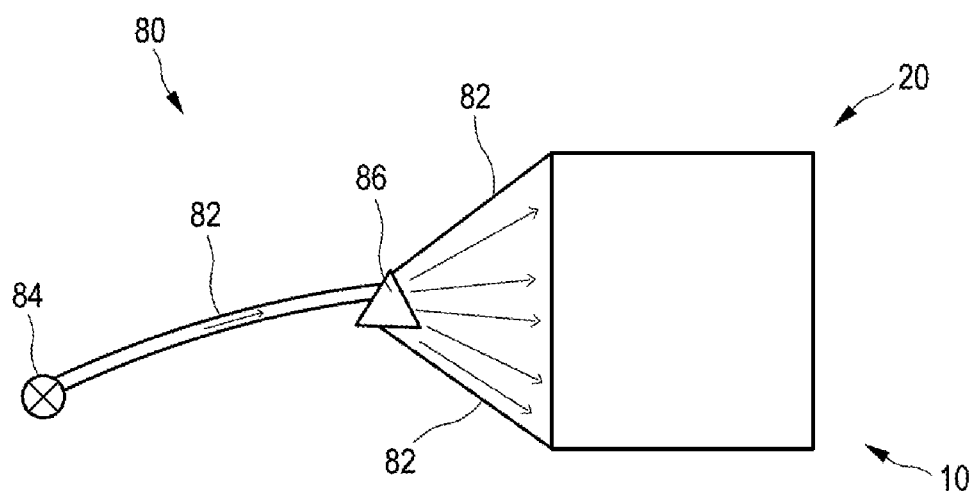
FIG. 6 shows a schematic view of a further exemplary embodiment of an actuator device.

FIG. 6 shows a further exemplary embodiment of an actuator device 10 schematically and by way of example. Before the entry into the actuator component 20, the control component 80 in the light guide 82 has an optical element 86 for fanning out the beam. While in the example an incident beam 82 enters the optical element 86, a broad fan of optical rays leaves the optical element 86. The fan of rays may be introduced, for example, by means of multiple light guides 82 on the output side into the actuator component 20. The optical element 86 is, for example, a prism or the like.

Figure 7:
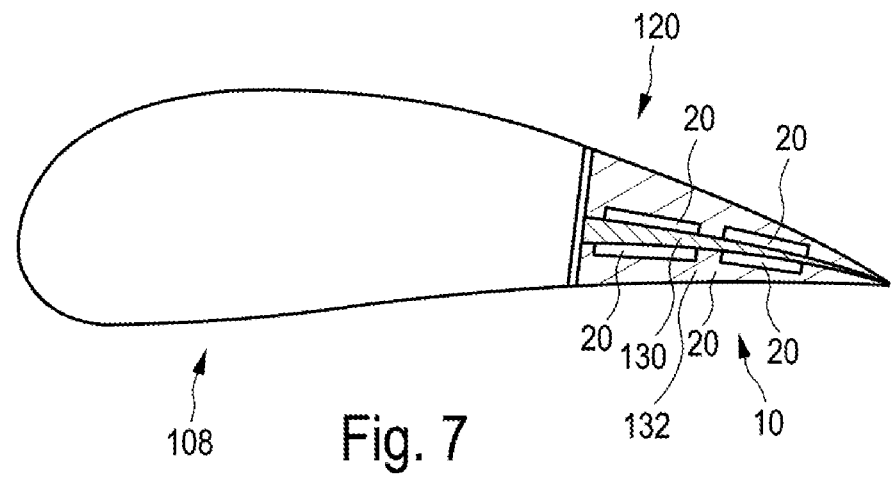
FIG. 7 shows a schematic view of an exemplary embodiment of an actuator device on a rotor blade.

FIG. 7 shows schematically and by way of example an exemplary embodiment of the actuator device 10 which is used in a trailing edge region 120 of a rotor blade 108 of a wind power installation is designed for implementing the activation of a servo flap. FIG. 7 shows the profile of the rotor blade 108 of the wind power installation in cross section. The trailing edge region 120 has in this embodiment a carrier substrate 130, which is arranged substantially in the middle of the profile. Arranged around the carrier substrate 130, both on the upper side and on the lower side in the example, are four actuator components 20. In this example, the actuator components 20 are two-dimensional actuators, which bring about a bending of the entire actuator component 20. For the shaping, and to complete the profile of the trailing edge region 120, the carrier substrate 130 and the actuator components 20 are enclosed in an elastic molding material 132.

Figure 8A:
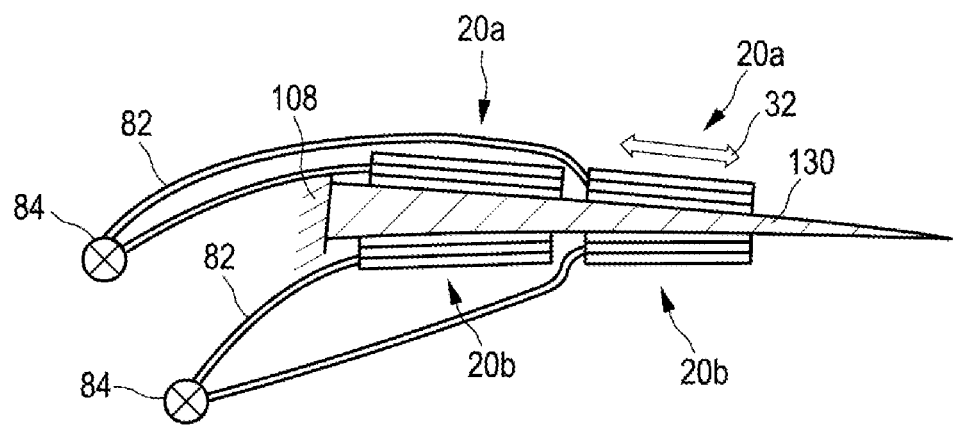
FIGS. 8*a* and 8*b* show schematic views of a detail of the exemplary embodiment shown in FIG. 7.
Figure 8B:
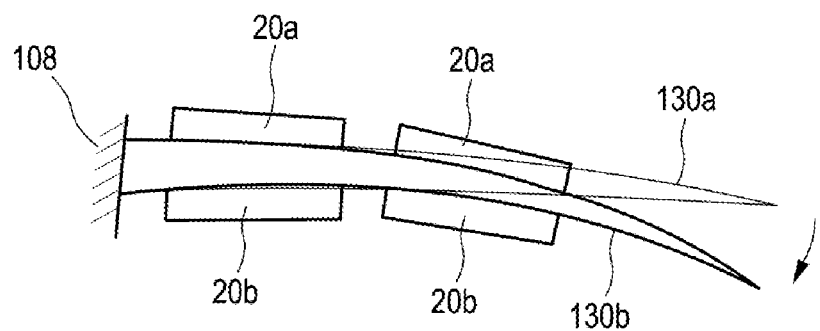

The functional principle of the trailing edge flap 120 shown in FIG. 7 is shown in detail with reference to FIGS. 8a and 8b. FIGS. 8a and 8b show the trailing edge or flap region 120 enlarged and without the elastic molding material 132 in the profile. The carrier substrate 130, which, for example, comprises a GFRP or similar material or consists thereof, is shown in FIG. 8a in a neutral position. That is to say that the carrier substrate 130 has not been deflected, which corresponds to a neutral flap position. Both on the upper side and on the underside, that is to say, with respect to the rotor blade 108, both on the suction side and on the pressure side, the carrier substrate 130 has two actuator components 20a and 20b, respectively. The preferential direction 32 of the respective actuator components 20a, 20b runs in the direction of the profile chord of the rotor blade 108. The carrier substrate 130 is attached at the front end, that is to say the end that points in the direction of the leading edge of the rotor blade 108, to the rotor blade 108.

The actuator components 20a and 20b are respectively activated by an independent light source 84, since the activation of the actuator components 20a may be different from the activation of the actuator components 20b, as further described below. Because the actuator components 20a are activated on the suction side, to perform an extension in the preferential direction 32, the carrier substrate 130 undergoes a bending, which corresponds to the changeover from the position 130a to the position 130b in FIG. 8b. In a preferred embodiment, the actuator components 20b are activated simultaneously in such a way that they undergo a compression at the same time. Consequently, the bending of the carrier substrate 130 does not have to take place counter to the actuator components 20b, but by contrast may even take place with their assistance. For the reverse process, that is to say the changeover of the carrier substrate from the bent position 130b to the neutral position 130a, a reverse activation of the actuator components 20b or 20a is necessary. For example, the actuator components 20a may be activated in such a way that they undergo a compression. Alternatively, or preferably in addition thereto, the actuator components 20b may be activated to undergo an extension. In FIG. 8, the actuator components 20 are shown by way of example as comprising three layers, two actuator layers with an exciting layer arranged in between. It goes without saying that, in other exemplary embodiments, other configurations of the actuator components 20 may also be used.

In all of the embodiments, an activation, in particular by the control component 80, preferably comprises an illumination, a non-illumination or any desired combination or intermediate stage of illumination and non-illumination, for example illumination with reduced intensity, with modulations, variable patterns, wavelengths, etc. A simultaneous activation of multiple actuator components accordingly comprises for example also a simultaneous activation by illumination, by non-illumination or by each of the combinations just mentioned.

FIGS. 9a to 9d show a further exemplary embodiment of an actuator device 10 with a preferential direction 32, which is perpendicular to the direction with which the light guide 82 introduces light into the exciting layer 40.

Figure 9A:
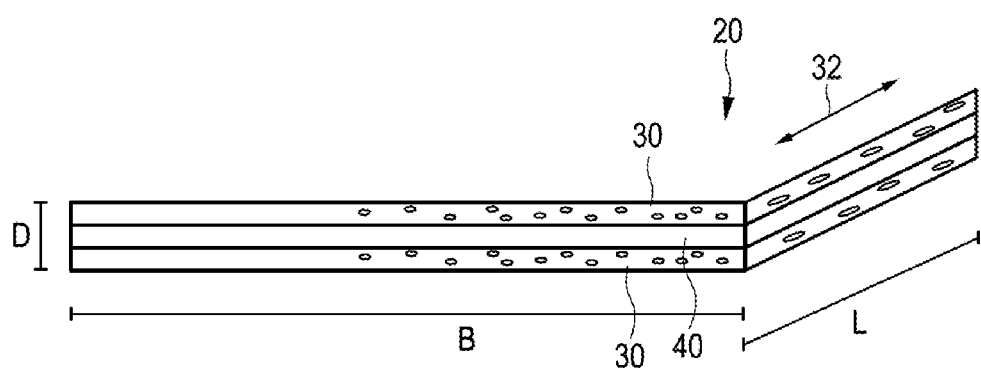
FIGS. 9*a* to 9*d* show schematic views of a further exemplary embodiment of an actuator device.
Figure 9B:
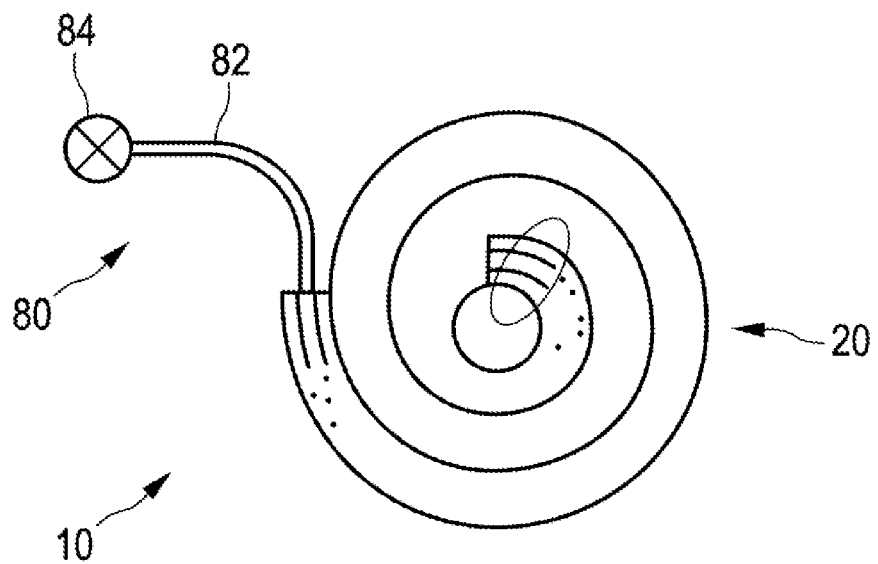
Figure 9C:
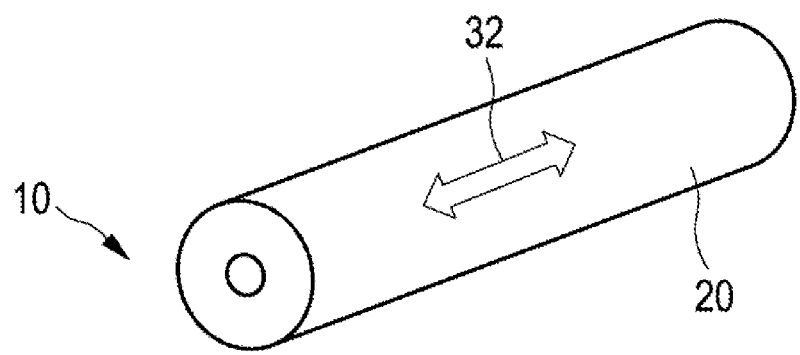

FIG. 9a schematically shows a two-dimensionally configured actuator component 20 with two actuator layers 30 and an exciting layer 40 lying in between. The preferential direction 32 corresponds to a longitudinal direction defined as L; the individual layers of the actuator component 20 are stacked in a thickness in the direction D and the two-dimensional extent of the actuator component comprises not only the longitudinal direction L but also a widthwise direction B. FIG. 9b thus shows how the actuator component 20 shown in FIG. 9a is rolled up along the widthwise direction B. The preferential direction 32 does not change thereby; that is to say that it still runs in the longitudinal direction L, in FIG. 9b perpendicularly to the plane of the drawing. This is shown perspectively in FIG. 9c. In comparison with the representation of FIG. 9a, it can be clearly seen that the actuator device 10 requires less extent in the widthwise direction B. Consequently, an actuator that has the same actuator effect as the two-dimensional actuator shown in FIG. 9a, but requiring only a fraction of the base area, can be realized. This is particularly advantageous for applications in which space is critical.

Figure 9D:
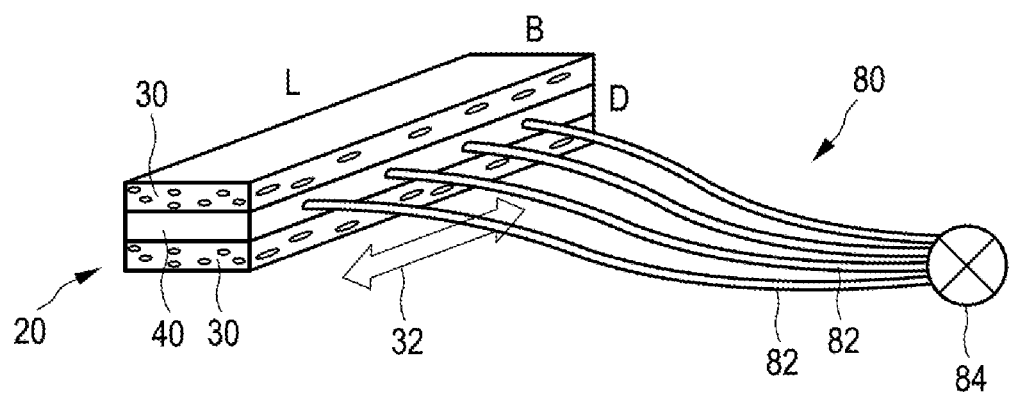

In FIG. 9d, a detail of the actuator component 20 shown in FIG. 9a is schematically and perspectively shown, while depicting the connection of the control component 80 including the light source 84 and multiple light guides 82, which introduce light into the exciting layer 40 at various positions in the longitudinal direction L.

Figure 10:
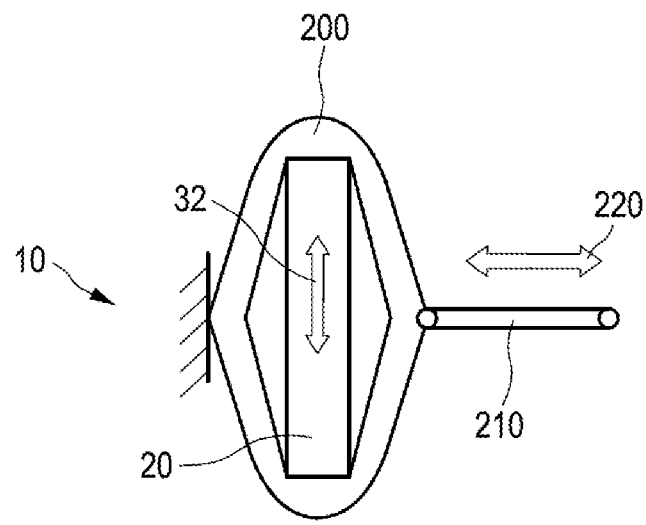
FIG. 10 shows a schematic view of an exemplary embodiment with an amplification frame.

FIG. 10 shows schematically and by way of example an exemplary embodiment of the actuator device 10, with an amplification frame 200 for transforming the movement of the actuator in the preferential direction 32. In this exemplary embodiment, the actuator component 20 is preferably configured as a stack of layers, the preferential direction 32 corresponding to the stacking direction of the layers. The amplification frame 200 transforms the movement in the preferential direction 32 to produce as a result an actuator direction 220 substantially perpendicular thereto with a transformation ratio that can be set. For example, in this way, a push-pull rod 210 can be moved over a much greater distance in the actuator direction 220 than the actuator component 20 extends or is compressed in the preferential direction 32. The design of the actuator is similar to the known design of a piezo stack; typical amplification factors for the amplification frame 200 are in the range of around 5. That is to say that an extension by, for example, 100 μm in the preferential direction 32 results in an extension by, for example, 500 μm along the actuator direction 220. The amplification frame 200 is just one example of a transformation device, and the push-pull rod 210 is also just one example of a coupling element; other implementations are known to a person skilled in the art.

Figure 11:
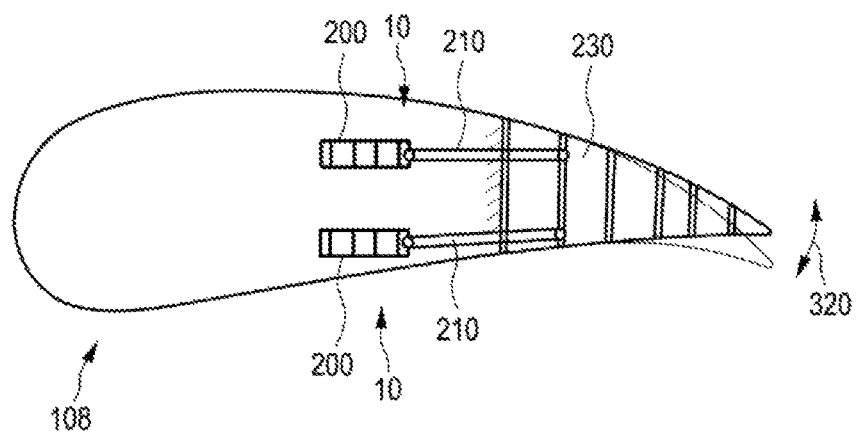
FIG. 11 shows schematically and by way of example a cross section of a rotor blade with a lift flap.

FIG. 11 shows schematically and by way of example a cross section of a rotor blade 108 with a lift flap 230, which is controlled by two actuator devices 10, as shown for example in FIG. 10. Each of the actuator devices 10 has the amplification frame 200 and brings about an activation of the push-pull rods 210, so that the flap 230 is deflected along a deflecting direction 320. In comparison with a servo flap, the lift flap 230 substantially does not bend, but instead is mechanically displaced as a whole. For this purpose, preferably the two push-pull rods 210 are moved in opposite directions, so that there is a tilting of the flap 230 in the direction 320. Although in this example push-pull rods 210 are used as force transmitters, all other mechanical implementations are of course also conceivable in other exemplary embodiments.

Although lift flaps and servo flaps have been described by way of example as active elements in exemplary embodiments, the above advantages can also be achieved for other active elements, for example vortex generators and the like. Combinations, such as for example a combined lift and servo flap, are also advantageously conceivable.

Figure 12:
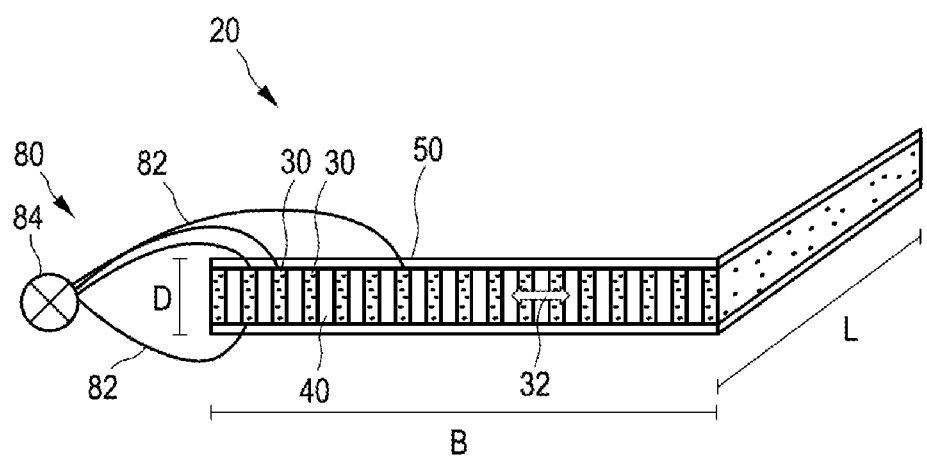
FIG. 12 shows schematically and by way of example a perspective view of a further exemplary embodiment of an actuator device.

FIG. 12 schematically shows a further exemplary embodiment of a two-dimensionally configured actuator component 20, as shown for example in FIG. 9a. FIG. 12 shows a two-dimensional actuator, in which the extent of the actuator layers 30 and exciting layers 40 is perpendicular to the actuator area with which the actuator is in connection with a substrate, for example part of the rotor blade of the wind power installation. The embodiment can consequently be regarded as a stack actuator, from which a thin slice with a thickness D has been cut off and laid out flat along the widthwise direction B and lengthwise direction L. The arrangement allows an extension under strain in the preferential direction 32, which lies in the two-dimensional plane. The preferential direction 32 is perpendicular to the actuator layer 30, which are stacked along the preferential direction 32. In this exemplary embodiment, the actuator component 20 also comprises a mirror coating 50, which acts as a reflective layer and ensures an optimum introduction of the excitation light from the light guides 82 into the exciting layers 40.

The invention claimed is:

1. An actuator device for a wind power installation comprising:
   an actuator component comprising an actuator layer, an exciting layer, and a photoactuator; and
   a control component comprising a light source and a light guide,
   wherein the actuator layer has a preferential direction, and wherein the exciting layer is substantially parallel to the actuator layer,
   wherein the photoactuator is configured to change at least one of: a strain and a stress of the actuator layer in the preferential direction on the basis of excitation light,
   wherein the exciting layer is configured to guide excitation light into the actuator layer, and
   wherein the light source is arranged away from the exciting layer and is connected to the exciting layer by the light guide, wherein the light guide is arranged in such a way as to introduce light into the exciting layer in a longitudinal direction, the longitudinal direction lying in a plane of the exciting layer.

2. The actuator device as claimed in claim 1, wherein the photoactuator comprises at least one actuator chosen from: a photostrictive actuator and a photomechanical actuator.

3. The actuator device as claimed in claim 2, wherein the photoactuator is a photomechanical actuator comprising an actuator from at least one of the following groups:
   polarized photomechanical actuators,
   liquid-crystal-based photomechanical actuators,
   photomechanical actuators based on optothermal transitions,
   charge-induced photomechanical actuators, and
   photomechanical actuators based on radiation pressure.

4. The actuator device as claimed in claim 1, wherein the photoactuator comprises at least one material belonging to one of the following groups:
   rotaxanes,
   optically activatable piezo crystals,
   carbon nano objects, in particular carbon nano tubes,
   ferroelectric materials,
   photoisomerizable organic compounds,
   liquid-crystalline materials, and
   xerogels.

5. The actuator device as claimed in claim 1, wherein the actuator layer is anisotropic in at least one direction.

6. The actuator device as claimed in claim 1, wherein the actuator layer comprises a fiber composite.

7. The actuator device as claimed in claim 1, wherein the photoactuator in the actuator layer is embedded in a resin matrix.

8. The actuator device as claimed in claim 1, wherein the actuator component has two actuator layers, wherein the exciting layer is between the two actuator layers.

9. The actuator device as claimed in claim 1, wherein the actuator component is configured to apply, by excitation light, a force of 10 to 50 N/mm$^2$ of the cross-sectional area of the actuator component, wherein the cross-sectional area of the actuator component is perpendicular to the preferential direction.

10. The actuator device as claimed in claim 1, wherein:
   the actuator component is configured as an extension actuator component, wherein the preferential direction is substantially perpendicular to the actuator layer, or
   the actuator component is configured as a bending actuator component, wherein the preferential direction is substantially in a plane of the actuator layer.

11. The actuator device as claimed in claim 10, wherein a ratio of an actuator area to a square of a reference length of the actuator component lies in a range of 0.0001 to 0.01.

12. The actuator device as claimed in claim 10, wherein mechanical work performed by the actuator component lies in a range of 100 to 10 000 joules per cubic meter of actuator volume,
   wherein when the actuator component is configured as an extension actuator component, the mechanical work lies in a range of 1000 to 10 000 joules per cubic meter of actuator volume, or
   wherein when the actuator component is configured as a bending actuator component, the mechanical work lies in a range of 100 to 1000 joules per cubic meter of actuator volume.

13. The actuator device as claimed in claim 10, wherein the actuator component is configured as a bending actuator component and is configured to bend in response to excitation perpendicular to a plane of the actuator layer and perpendicular to the preferential direction.

14. The actuator device as claimed in claim 13, wherein a ratio of a height of the actuator component to a length of the actuator component in a preferential direction lies in a range of 0.001 to 0.1.

15. The actuator device as claimed in claim 14, wherein a height of the actuator component perpendicular to a plane of the actuator layer lies in a range of 1 mm to 10 mm.

16. The actuator device as claimed in claim 1, wherein the exciting layer comprises at least one material chosen from glass and polymer, wherein the at least one material has a thickness in a range of 20 μm to 100 μm.

17. The actuator device as claimed in claim 1, wherein the actuator component has a mirror coating configured to reflect the excitation light, wherein the mirror coating at least partially surrounds the actuator component on at least one side face.

18. The actuator device as claimed in claim 1, wherein the plane of the exciting layer is defined by the longitudinal direction and a widthwise direction,
   wherein the preferential direction substantially corresponds to the longitudinal direction or a direction deviating therefrom that lies in a plane of the actuator layer in a case in which the actuator component is configured as a bending actuator component, or
   the preferential direction is substantially perpendicular to the longitudinal direction and/or the plane of the actuator layer in a case in which the actuator component is configured as an extension actuator component.

19. The actuator device as claimed in claim 1 further comprising an amplification frame that encloses the actuator component,
   wherein the amplification frame is arranged in such a way that an extension of the actuator layer in the preferential direction leads to a compression of the amplification frame perpendicularly to the preferential direction, and
   wherein the amplification frame is designed for transformation between movement in the preferential direction and perpendicularly thereto.

20. The actuator device as claimed in claim 1, wherein a side surface of the exciting layer has a plurality of diffusion elements configured to diffuse introduction of excitation light into the actuator layer, wherein the plurality of diffusion elements are surface irregularities that include microcavities.

21. The actuator device as claimed in claim 1, wherein the exciting layer has a conversion element configured to convert light from the light source into excitation light, wherein the excitation light has a different wavelength and a different spectrum than the light of the light source.

22. A rotor blade of a wind power installation, the rotor blade comprising:
   an actuator device as claimed in claim 1; and
   an active element, wherein the actuator device is configured to control the active element.

23. The rotor blade as claimed in claim 22, wherein:
   the actuator component of the actuator device is configured as a bending actuator component,
   the active element is a servo flap, and
   the actuator component is mounted in surface contact with the servo flap.

24. The rotor blade as claimed in claim 22, wherein:
   the actuator component of the actuator device is configured as an extension actuator component, and
   the active element is configured as a lift flap, and wherein the rotor blade has a transforming unit for transforming movement of the actuator component into a control of the lift flap.

25. The rotor blade as claimed in claim 24, wherein:
   the actuator device has an amplification frame that encloses the actuator component, and
   the transforming unit has a push/pull rod for coupling the amplification frame to the lift flap.

26. A wind power installation comprising the rotor blade as claimed in claim 22.

27. A method of assembly for assembling the actuator device as claimed in claim 1 on a rotor blade, wherein the method comprises:
   attaching the actuator component to the rotor blade; and
   connecting the control component to the actuator component.

28. An actuator device for a wind power installation comprising:
   an actuator component comprising an actuator layer, an exciting layer, and a photoactuator; and
   a control component comprising a light source and a light guide,
   wherein the actuator layer has a preferential direction, and wherein the exciting layer is substantially parallel to the actuator layer,
   wherein the photoactuator is configured to change at least one of: a strain and a stress of the actuator layer in the preferential direction on the basis of excitation light,
   wherein the light source is arranged away from the exciting layer and is connected to the exciting layer by the light guide, and
   wherein the exciting layer is configured to guide light from the light guide as excitation light into the actuator layer, wherein the guiding includes a change of the light propagation direction between the light guide and the actuator layer.

* * * * *